(12) United States Patent
Oba et al.

(10) Patent No.: US 7,181,024 B1
(45) Date of Patent: Feb. 20, 2007

(54) PORTABLE AUDIO LISTENING APPARATUS

(75) Inventors: Haruo Oba, Kanagawa (JP); Keiichi Totsuka, Tokyo (JP); Shigeru Tajima, Kanagawa (JP); Chisato Numaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 09/705,035

(22) Filed: Nov. 2, 2000

(30) Foreign Application Priority Data

Nov. 11, 1999 (JP) ............................... P11-320629

(51) Int. Cl.
  *H04B 3/00* (2006.01)
  *H04B 5/00* (2006.01)
(52) U.S. Cl. ............................... 381/77; 381/79; 381/74
(58) Field of Classification Search .................. 381/74, 381/77, 334, 311, 79; 600/547; 345/156
See application file for complete search history.

(56) References Cited

U.S. PATENT DOCUMENTS

| | | | |
|---|---|---|---|
| 4,450,495 A | * | 5/1984 | Naruki ........................ 360/137 |
| 5,247,293 A | * | 9/1993 | Nakagawa ................... 381/311 |
| 5,444,768 A | * | 8/1995 | Lemaire et al. ............... 379/68 |
| 5,551,065 A | | 8/1996 | Honore |
| 5,796,827 A | * | 8/1998 | Coppersmith et al. ...... 713/182 |
| 5,914,701 A | * | 6/1999 | Gersheneld et al. ........ 345/156 |
| 6,118,882 A | * | 9/2000 | Haynes ........................ 381/374 |
| 6,285,867 B1 | * | 9/2001 | Boling ..................... 455/404.1 |

FOREIGN PATENT DOCUMENTS

JP          7-170215          4/1995

* cited by examiner

*Primary Examiner*—Xu Mei
(74) *Attorney, Agent, or Firm*—Bell, Boyd & Lloyd LLP

(57) ABSTRACT

A portable audio listening apparatus includes, for example, a portable audio playback apparatus serving as a portable transmission apparatus and a headphone serving as a portable receiving apparatus. The portable audio playback apparatus has an electrode at its side. The headphone includes an ear pad made from an electrically conductive material and an electric-circuit unit. The ear pad serves as an electrode and is connected to the electric-circuit unit by wiring. The electric-circuit unit includes a signal processing circuit and a battery. When the user wears the portable audio playback apparatus and the headphone, a transmission path is formed through the body of the user. A signal reproduced by the portable audio playback apparatus is sent through the body of the user and the ear pad to the electric-circuit unit of the headphone.

8 Claims, 7 Drawing Sheets

PORTABLE AUDIO LISTENING APPARATUS

BACKGROUND OF THE INVENTION

1. Field of the Invention

The present invention relates to portable audio listening apparatuses, and more specifically, to a portable audio listening apparatus in which a headphone can be connected to a player at any place without wire.

2. Description of the Related Art

Conventionally, portable players, typical of which is a Walkman (a trade name of Sony Corporation), have been widely used to listen to music by connecting them to headphones. Portable players can be put in bags or mounted on human bodies by belts. When headphones are used, the cables thereof may restrict the movement of the user. Recently, musical information can be sent by radio from players to headphones with the use of infrared light. For outdoor use, however, it is not necessarily successful to use infrared-light communication in natural light. It can also be considered that musical information is distributed by radio other than infrared light. The current technologies, however, cannot assure high-sound-quality transfer. Therefore, a technology which allows high-sound-quality transfer by radio even outdoors has been demanded.

Conventionally, there has been known that communication between two independent apparatuses each having an electrode and emitting a weak radio wave which is insufficient in strength for communicating with each other is made possible by enhancing the radio wave through a human body (Japanese Unexamined Patent Application Publication No. Hei-7-170215 and U.S. Pat. No. 5,914,701). Such a method sufficiently transfers musical information having a quality of super audio CD (SACD).

SUMMARY OF THE INVENTION

The present invention has been made in consideration of the foregoing condition. Accordingly, an object of the present invention is to provide an audio listening apparatus which does not cause radio interference and which allows an audio signal to be positively transferred from a player to a headphone even in natural light without wire.

The foregoing object is achieved in one aspect of the present invention through the provision of a portable audio listening apparatus including means for generating an audio modulated signal modulated in a band in which a signal is transferred by using a human body; a first electrode for outputting the generated audio modulated signal; a second electrode for receiving an audio modulated signal transferred through the first electrode and a human body; means for demodulating the audio modulated signal received by the second electrode; and means for generating audible sound according to the demodulated signal.

In this structure, the modulated signal output from the first electrode is transferred to the second electrode through a human body and the transferred signal is demodulated to provide music without wire. Since the modulated signal is transferred through a human body, the radio wave itself can be weak. Therefore, the radio wave does not cause radio interference in the vicinity. Even in natural light, music is transferred without noise.

The foregoing object is achieved in another aspect of the present invention through the provision of a portable audio listening apparatus including a portable transmission apparatus and a portable receiving apparatus electrically and mechanically structured as different units, the portable transmission apparatus including means for generating an audio modulated signal modulated in a band in which a signal is transferred by using a human body; and a first electrode for outputting the generated audio modulated signal, and the portable receiving apparatus including a second electrode for receiving an audio modulated signal transferred through the first electrode and a human body; means for demodulating the audio modulated signal received by the second electrode; and means for generating audible sound according to the demodulated signal.

Also in this structure, the modulated signal output from the first electrode is transferred to the second electrode through a human body and the transferred signal is demodulated to provide music without wire. Since the modulated signal is transferred through a human body, the radio wave itself can be weak. Therefore, the radio wave does not cause radio interference in the vicinity. Even in natural light, music is transferred without noise.

The foregoing object is achieved in still another aspect of the present invention through the provision of a portable transmission apparatus including means for generating an audio modulated signal modulated in a band in which a signal is transferred by using a human body; and an electrode for outputting the generated audio modulated signal.

The foregoing object is achieved in yet another aspect of the present invention through the provision of a portable receiving apparatus including an electrode for receiving an audio modulated signal transferred through a human body; means for demodulating the audio modulated signal received by the electrode; and means for generating audible sound according to the demodulated signal.

The electrode of the portable transmission apparatus may be provided for the body of the apparatus. Alternatively, the electrode may be connected to a predetermined wire which is disposed near the body of the user. The former is suited to a case in which the body of the apparatus is mounted at the waist of the user by a belt, and the latter is suited to a case in which the apparatus is put in a bag.

As described above, according the present invention, a wireless, portable audio listening system which does not receive noise even in natural light, which does not cause radio-wave disturbance to other systems, and which does not cause radio interference is provided.

DESCRIPTION OF THE PREFERRED EMBODIMENTS

Embodiments of the present invention will be described below.

First Embodiment

A first embodiment of the present invention will be described first. In this embodiment, a headphone and a portable audio playback apparatus are used to send a reproduced audio signal to the headphone with the body of the user being used as a transmission path.

Figure 1:
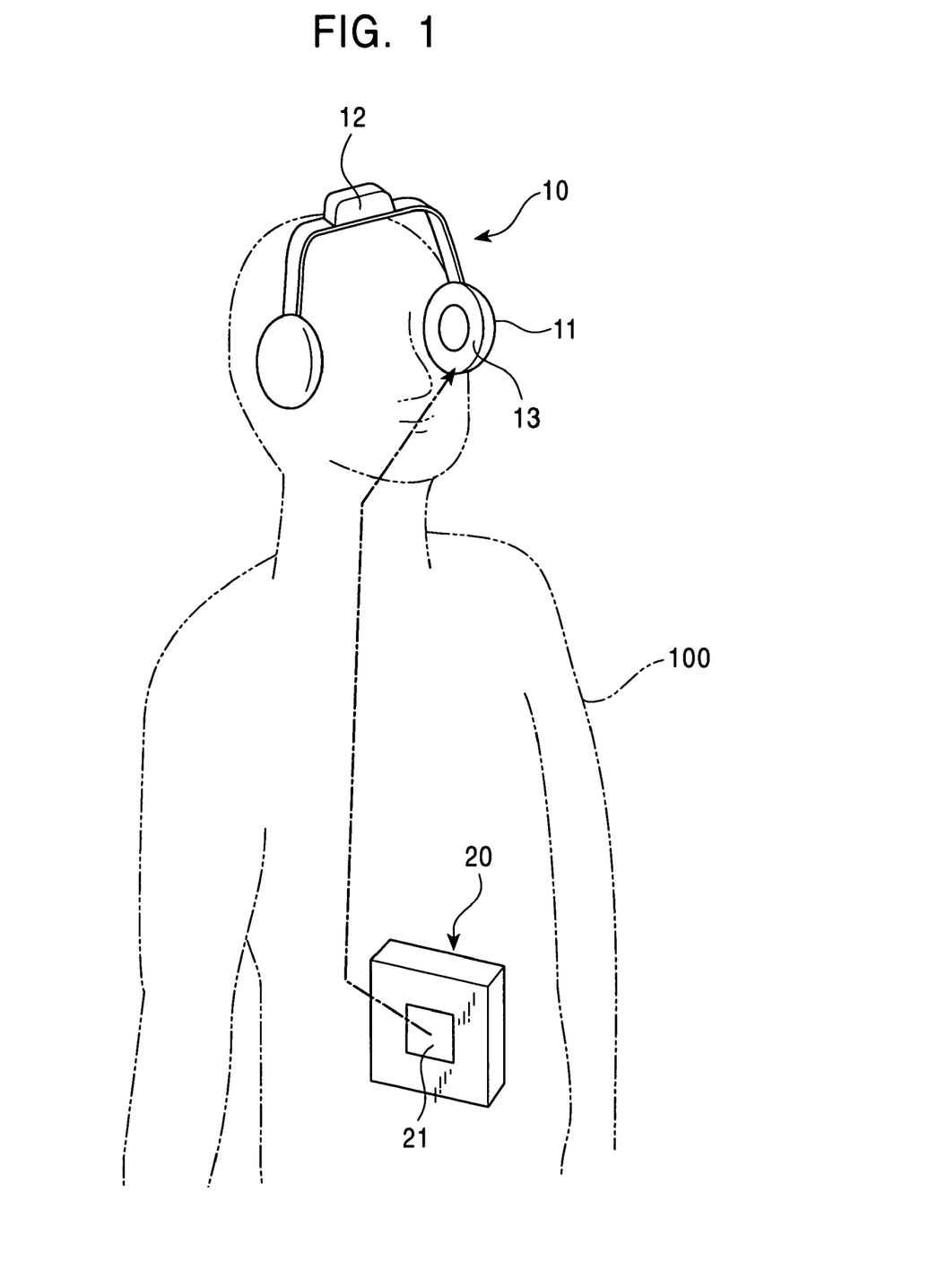
FIG. 1 is a view showing a whole system according to a first embodiment of the present invention.

FIG. 1 shows a headphone 10 and a portable audio playback apparatus 20 in the first embodiment. In the figure, the headphone 10 is formed of a headphone body 11, an electric-circuit unit 12, and ear pads 13. The headphone 10 has the same structure as usual headphones. The ear pads 13 provided for the headphone body 11 are made from an electrically conductive material. The ear pads 13 serve as electrodes and are connected to the electric-circuit unit 12 by wiring (not shown). By this wiring, a signal transferred through the body of the user and the ear pads 13 is sent to the electric-circuit unit 12. The electric-circuit unit 12 accommodates a signal processing circuit 14 (FIG. 3) and a battery (not shown).

The portable audio playback apparatus 20 is almost the same as a usual portable audio playback apparatus, such as a Walkman (trade name) of Sony Corporation, and has an electrode 21 at its side.

When the user 100 wears the headphone 10 and the portable audio playback apparatus 20, a transmission path is formed as indicated by a one-dot chain line, and an reproduced output is transferred from the portable audio playback apparatus 20 to the headphone 10. Details of the mechanism of signal transfer through a human body are disclosed in Japanese Unexamined Patent Application Publication No. Hei-7-170215.

Figure 2:
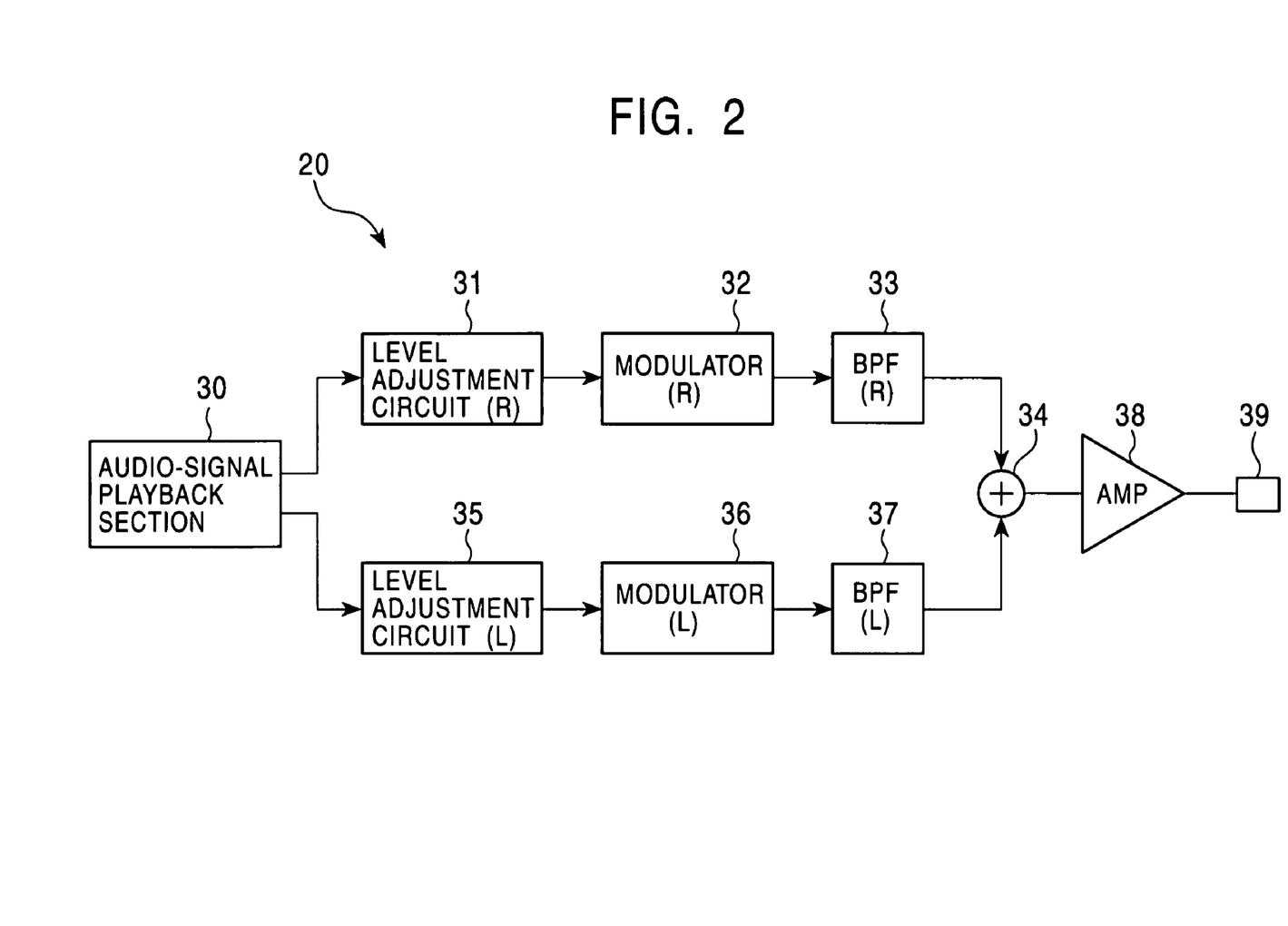
FIG. 2 is a block diagram showing the circuit structure of a portable audio playback apparatus of the first embodiment.

FIG. 2 shows the circuit structure of the portable audio playback apparatus 20 shown in FIG. 1. In FIG. 2, an audio-signal playback section 30 reproduces audio signals (for R channel and for L channel) from a cassette tape, a Mini disk, a compact disk, or a semiconductor memory. These media which store audio signals may be detachable, or secured. Various recording methods can be employed.

An R-channel reproduced signal is sent to a mixer 34 through a level adjustment circuit 31, a modulator 32, and a band-pass filter 33 for the R channel. The modulator 32 performs modulation, for example, at a modulation frequency of 2.3 MHz. An L-channel reproduced signal is sent to the mixer 34 through a level adjustment circuit 35, a modulator 36, and a band-pass filter 37 for the L channel. The output of the mixer 34 is amplified by an output amplifier 38, and then sent to an output terminal 39. The output terminal 39 is connected directly or indirectly to the electrode 21 of the portable audio playback apparatus 20 shown in FIG. 1.

Figure 3:
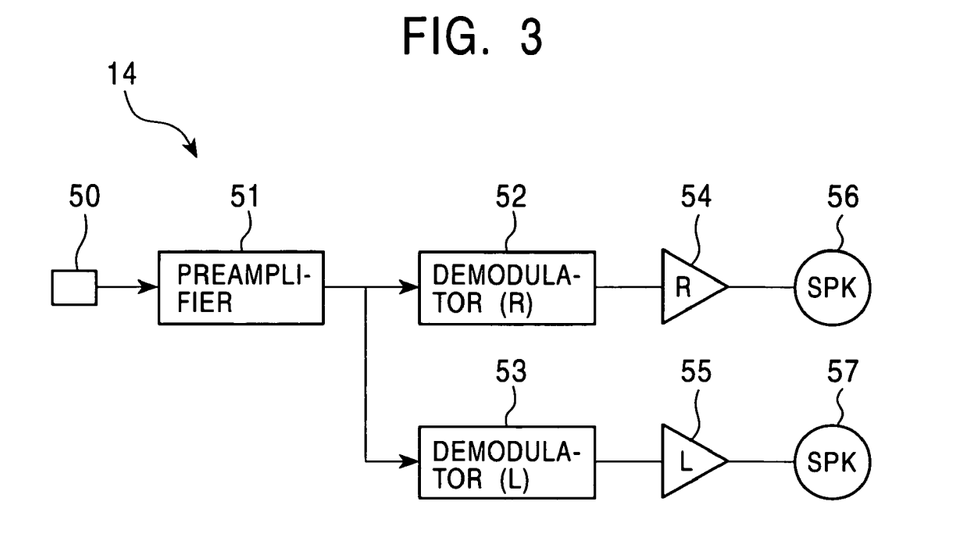
FIG. 3 is a block diagram showing the structure of a signal processing circuit of a headphone in the first embodiment.

FIG. 3 shows the signal processing circuit 14 provided for the electric-circuit unit 12 shown in FIG. 1. In this figure, an input terminal 50 is directly or indirectly connected to the electrically conductive ear pads 13 shown in FIG. 1. A signal output from the portable audio playback apparatus 20 is sent to the ear pads 13 through the body of the user, and then is sent from the ear pads 13 to the signal processing circuit 14 of the electric-circuit unit 12 through predetermined signal lines (not shown). The modulated signal input to the input terminal 50 is amplified by a preamplifier 51, and then is sent to an R-channel demodulator 52 and to an L-channel demodulator 53 and demodulated. The demodulated audio signals are amplified by output amplifiers 54 and 55, and then sent to speaker elements 56 and 57. The speaker elements 56 and 57 are disposed at the ear pads 13, and connected to the electric-circuit unit 12 through predetermined wiring.

In the present embodiment, an audio signal reproduced from the portable audio playback apparatus 20 is modulated, transferred through a human body, which serves as a transmission path, demodulated by the signal processing circuit 14 in the headphone 10, and output from the speaker elements 56 and 57. With this structure, an audio signal is positively listened to without noise even in natural light while the body of the user does not serve as an obstacle.

The electrode 21 of the portable audio playback apparatus 20 assures a sufficient transfer characteristic with the body of the user even if it does not directly contact the skin of the user. Of course, the transfer characteristic may be improved by using an appropriate material of clothes. Alternatively, some measure may be taken so that the electrode 21 contacts the skin.

It may be also allowed that the portable audio playback apparatus 20 is connected to a wire and the wire itself or an electrode connected to the open end of the wire contacts the body of the user directly or through clothes. In this case, the portable audio playback apparatus 20 may be slightly apart from the body of the user, such as in a case in which the apparatus 20 is put in a bag.

In the above embodiment, the ear pads 13 of the headphone 10 serve as electrodes. The electric-circuit unit 12 may be connected to a wire which is directly or indirectly connected to the body of the user. The ear pads may be provided with electrodes.

Figure 4:
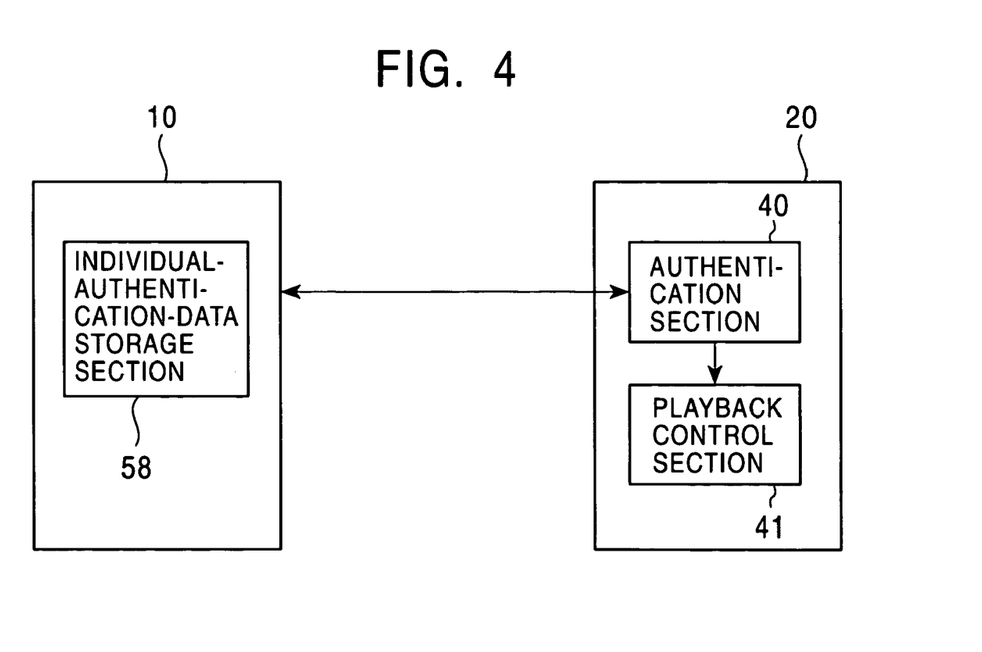
FIG. 4 is a view showing individual authentication in the first embodiment.

As shown in FIG. 4, it is also possible that the electric-circuit unit 12 of the headphones 10 is provided with an authentication-data storage section 58 for storing individual authentication data, and by using it, individual authentication is executed by an authentication section 40 in the portable audio playback apparatus 20. An individual-authentication method may be a method using a simple code number or a method of authenticating a one-time password by a challenge and response. Only when a successful authentication is obtained, the authentication section 40 activates a playback control section 41 to output an audio signal. It is further possible that the portable audio playback apparatus 20 stores individual authentication data and the headphone 10 is provided with an authentication section. In this case, the headphone 10 is provided with a mute circuit such that listening is allowed only when a successful authentication is obtained.

Instead of the headphone 10, a small earphone may be used. In this case, if the circuit section cannot be placed in the earphone, the circuit section may be formed separately from the ear phone and connected thereto by wire.

Second Embodiment

A second embodiment of the present invention will be described below. In this embodiment, independent headphones 10R and 10L, one for the right ear and the other for the left ear, are provided. A portable audio playback apparatus 20 has the same structure as that of the first embodiment.

Figure 5:
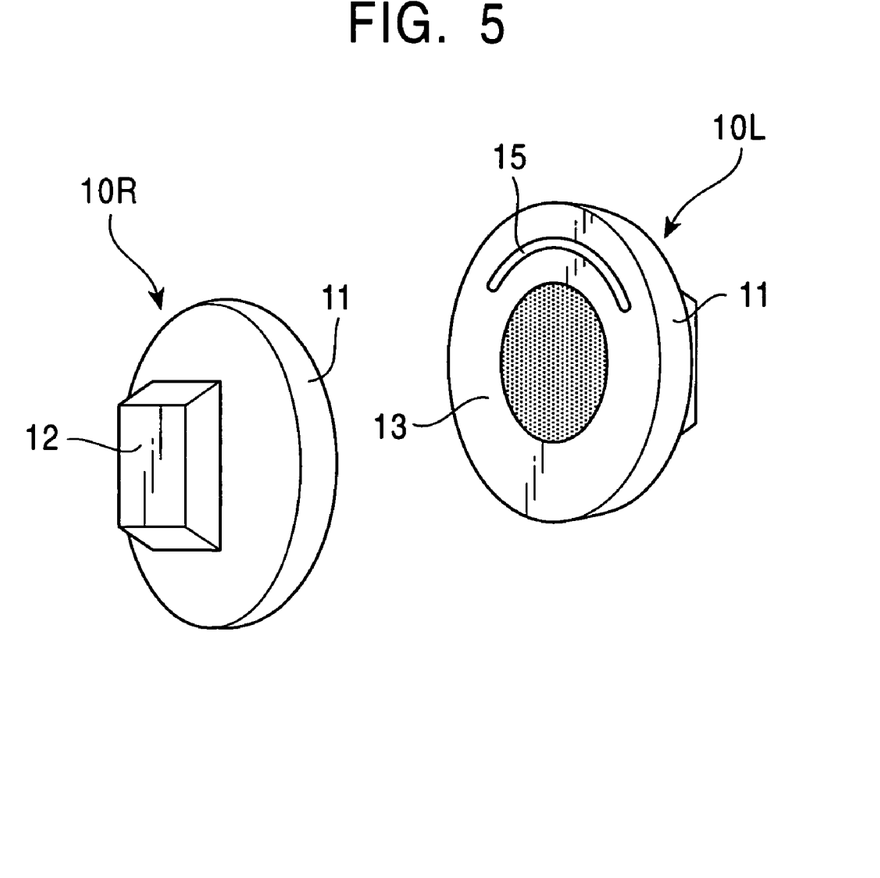
FIG. 5 is a view showing a system according to a second embodiment of the present invention.

FIG. 5 shows the headphones 10R and 10L of the present embodiment. Each headphone is formed of a headphone body 11, an electric-circuit unit 12, and an ear pad 13. The ear pad 13 is provided with an ear support 15. The headphone 10R is for the R channel, and the headphone 10L is for the L channel. A built-in demodulator 62 (shown in FIG. 6) determines the channel (either the R channel or the L channel). The headphones may be structured such that they can be used for both R and L channels and predetermined change-over switches determine the channels.

Figure 6:
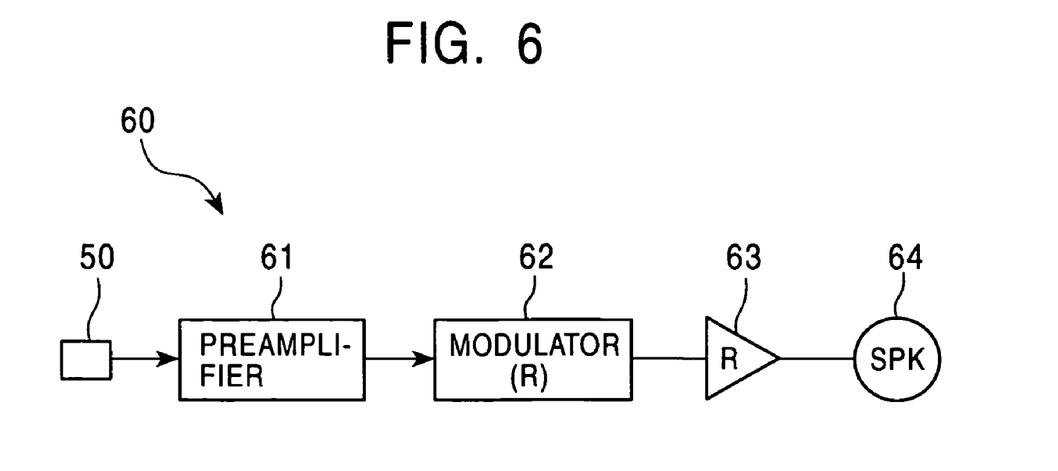
FIG. 6 is a block diagram showing the structure of a signal processing circuit of a headphone in the second embodiment.

FIG. 6 shows the structure of a signal processing circuit 60 of the electric-circuit unit 12 according to the present embodiment. The signal processing circuit 60 is formed of an input terminal 50, a preamplifier 61, a modulator 62, an amplifier 63, and a speaker element 64. This circuit operates in the same way as shown in FIG. 3 except that the circuit performs signal processing for either of the two channels.

Also in this structure, the user always receives a signal output from the portable audio playback apparatus 20 by radio to listen to sound in the same way as described in the first embodiment.

In the present embodiment, two headphones are separately prepared for the right ear and for the left ear. Only one of the two headphones may be used. In this case, a change-over switch may be provided such that one of an R-channel signal, an L-channel signal, and a mixed signal for the R and L channels can be received. To reproduce the mixed signal, a mixer is required. If the original signal is not a stereo signal, the circuit shown in FIG. 6 can be used as is.

Third Embodiment

A third embodiment of the present invention will be described next. In the present embodiment, musical data can be externally downloaded through the body of the user. A recording function is added to a portable audio playback apparatus 20 in the present embodiment. Hereinafter, the apparatus is called a portable audio recording and playback apparatus 20 for convenience.

Figure 7:
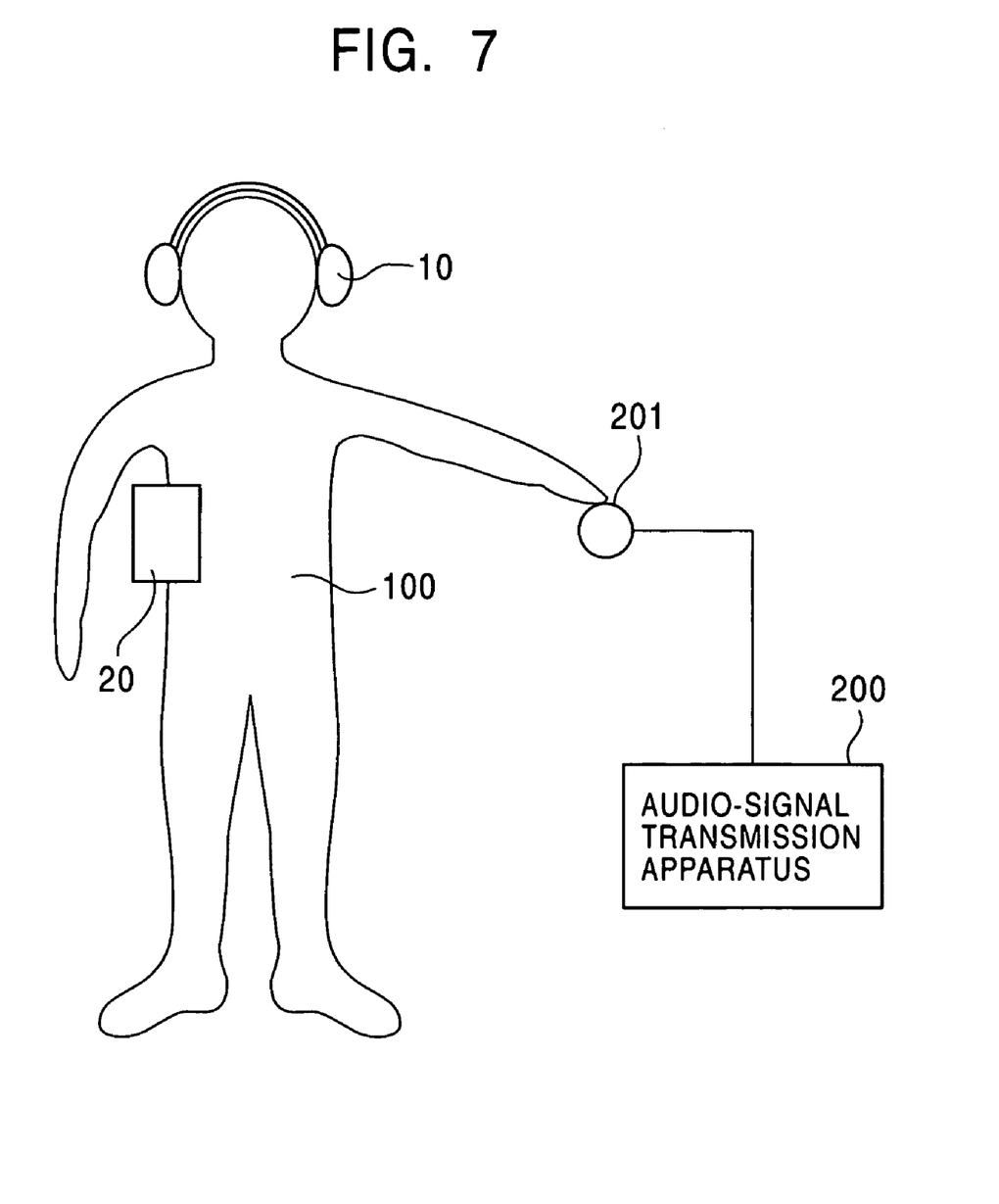
FIG. 7 is a view showing a system according to a third embodiment of the present invention.

FIG. 7 shows the present embodiment as a whole. In FIG. 7, the user wears a headphone 10 and the portable audio recording and playback apparatus 20. The user touches an electrode 201 provided for an external audio-signal transmission apparatus 200 by a hand so that an audio signal sent from the audio-signal transmission apparatus 200 is recorded by the portable audio recording and playback apparatus 20.

According to the description of Japanese Unexamined Patent Application Publication No. Hei-7-170215, modulation frequencies of 2.3 MHz and 2.8 MHz can be used for audio signals, and video modulation frequencies of 11.5 to 13.5 MHz can also be used. In the present embodiment, this frequency band is used for audio-signal recording. For example, an audio signal to be recorded is modulated by using a modulation frequency of 11.5 MHz and the signal is transferred to the portable audio recording and playback apparatus 20 through the electrode and the body of the user.

Figure 8:
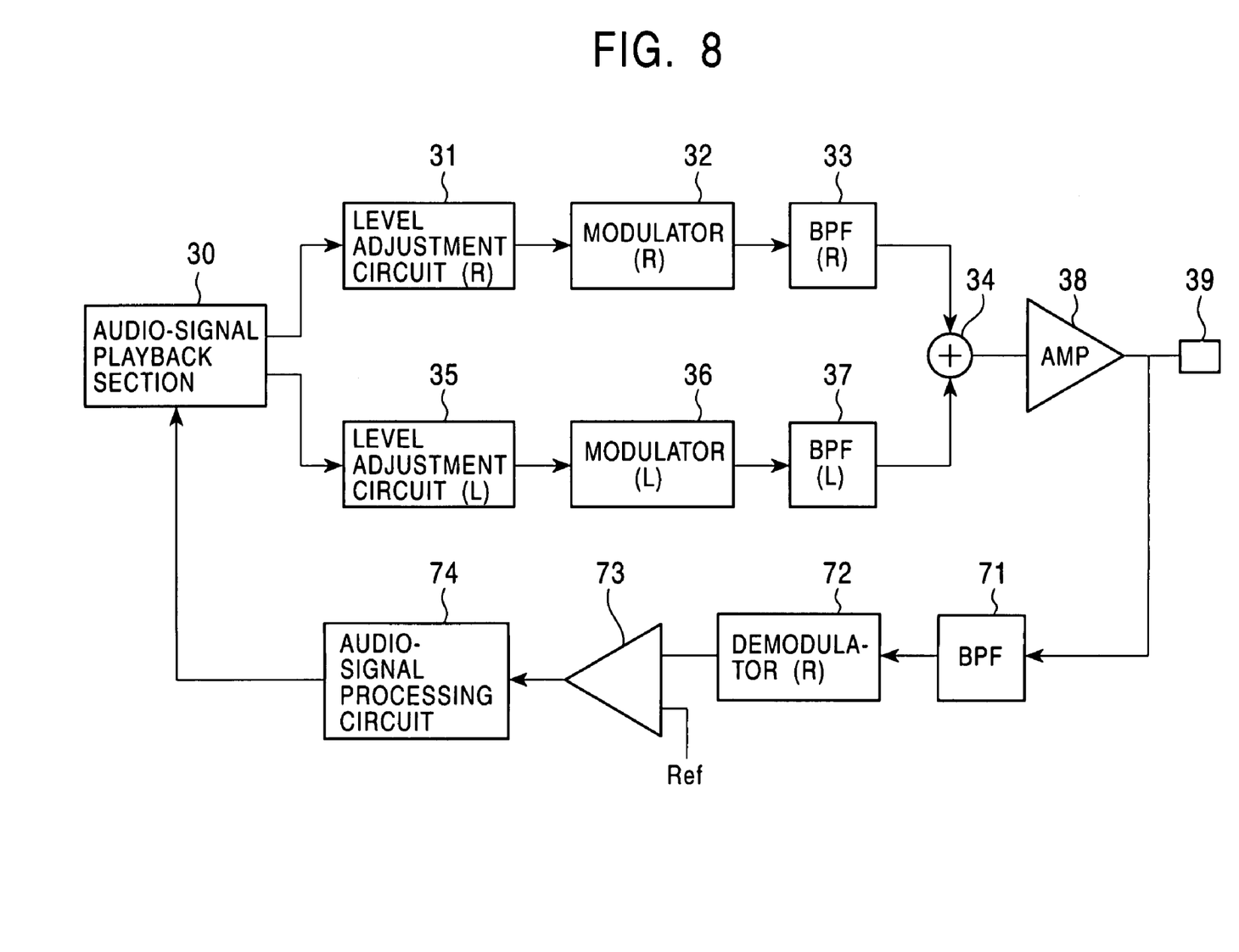
FIG. 8 is a block diagram showing the circuit structure of a portable audio recording and playback apparatus in the third embodiment.

FIG. 8 shows a signal processing circuit provided for the portable audio recording and playback apparatus shown in FIG. 7. The same symbols as those used in FIG. 2 are assigned to the portions corresponding to those shown in FIG. 8. In FIG. 8, an electrode 39 (corresponding to the electrode 21 shown in FIG. 1) is used for receiving a signal sent from the audio-signal transmission apparatus 200. A signal input through the electrode 39 is sent to a demodulator 72 through a band-pass filter 71 and demodulated. The band-pass filter 71 passes only signals having frequencies in the vicinity of 11 MHz. The audio-signal transmission apparatus 200 transmits, for example, converted digital signals (may transmit analog signals although they have noise). The input signal is waveform-shaped by a comparator 73 and sent to an audio-signal processing circuit 74. The audio-signal processing circuit 74 restores the audio data (original data) or the original analog audio signal according to the received signal. The musical data is sent to an audio-signal playback section 30 and recorded. The Moving Picture Coding Experts Group layer 3 (MPEG layer 3, or MP3) method can be used as a recording method.

In the present embodiment, since data is transferred through a frequency band exceeding 10 MHz, a transmission rate of about 1 Mbps can be easily achieved. Music of three minutes is transferred within several seconds if the music is recorded by the MP3 method.

FIG. 8 shows a case in which a signal to be downloaded, including a header signal, is transferred in one direction. An instruction to the audio-signal transmission apparatus 200 is given by a method other than the human-body transfer method, such as pressing a music selection button. When a modulator circuit for a video-signal band is added to the circuit shown in FIG. 8, bi-directional transfer (half duplex) can be easily implemented.

Figure 9:
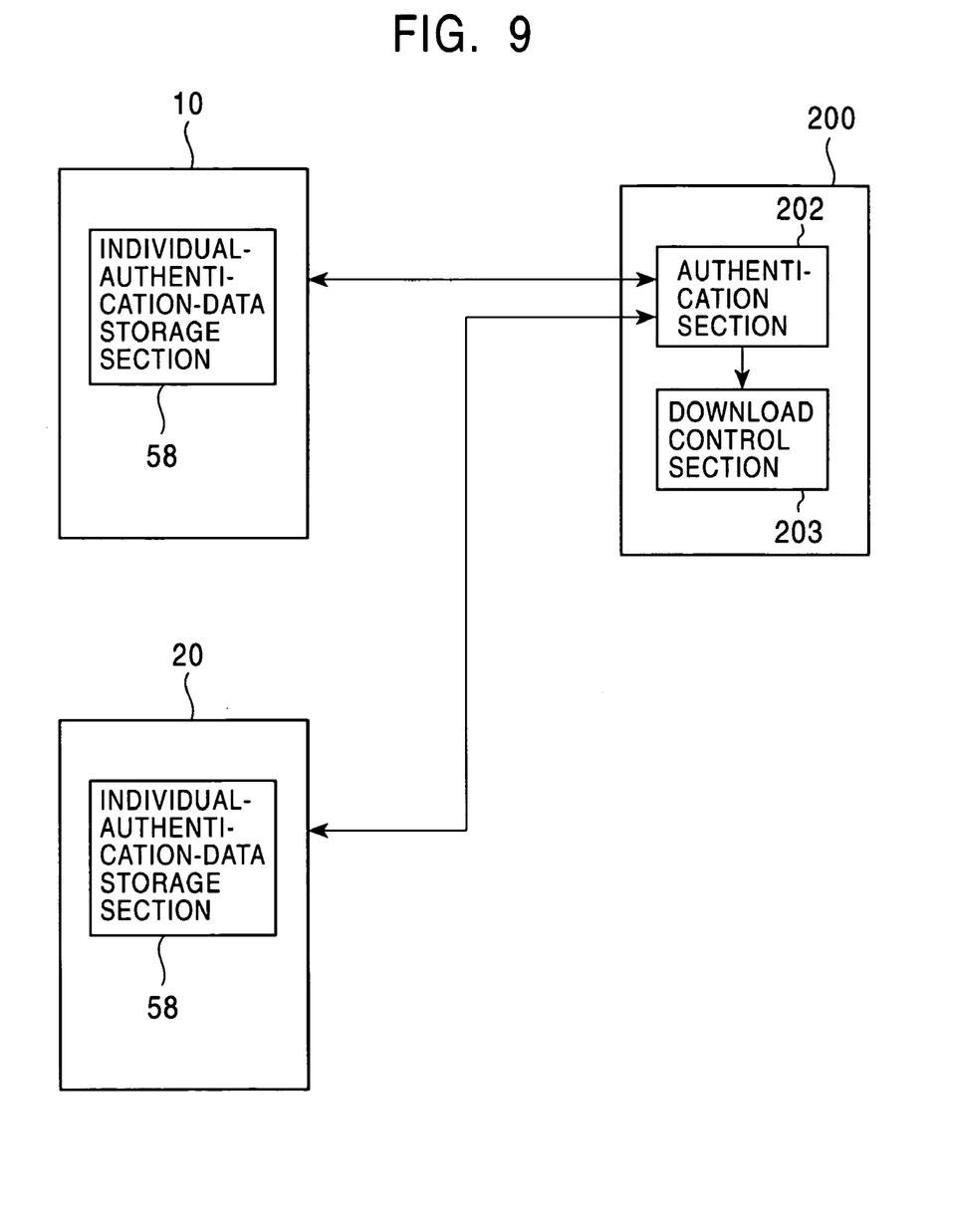
FIG. 9 is a view showing individual authentication in the third embodiment.

As shown in FIG. 9, it is possible that an individual-authentication-data storage section 58 is provided for the headphone 10 or the portable audio recording and playback apparatus 20, and an authentication section 202 provided for the audio-signal transmission apparatus 200 executes individual authentication. Only when a successful authentication is obtained, a download control section 203 is activated to execute downloading.

The present invention is not limited to the embodiments described above, and various modifications thereof are possible. For example, in the above embodiments, the 2.3-MHz frequency band and the 2.8-MHz frequency band are used for the R channel transfer and the L channel transfer, respectively. Since a frequency band of 2 to 30 MHz can be used for the human-body transfer method, when the band is divided, audio signals can be transferred through a vast number of channels. In this case, the 5+1 channel method of Dolby Digital (trade name) is implemented by a wireless headphone. Conventionally, it is very difficult for wireless radio transfer to implement such a method.

What is claimed is:

1. A portable audio listening apparatus comprising:
a transmission apparatus and a portable receiving apparatus electrically and mechanically structured as different units,
the portable transmission apparatus comprising:
means for generating an audio modulated signal modulated in a band in which a signal is transferred by using a human body of a single user, wherein the audio modulated signal is generated based on stored audio data; and
a first electrode for outputting the generated audio modulated signal, and
the portable receiving apparatus comprising:
a second electrode for receiving the audio modulated signal transferred through the first electrode and then through the body of the single user;
means for demodulating the audio modulated signal received by the second electrode and downloading said demodulated signal into said audio listening apparatus for storage; and
means for generating audible sound according to the stored demodulated signal;
wherein said second electrode is adapted to receive the audio module signal sent from an audio-signal transmission apparatus, wherein the portable receiving apparatus further comprises a transmitter for transmitting a second audio modulated signal through the body of the single user; and wherein the portable audio listening apparatus includes a second portable receiving apparatus, wherein the second portable receiving apparatus includes:

a third electrode for receiving the second audio modulated signal transferred through the body of the single user;

second means for demodulating the second audio modulated signal received by the third electrode; and second means for generating audible sound according to the demodulated second audio modulated signal.

2. A portable audio listening apparatus according to claim 1, wherein the transmission apparatus further comprises means for storing individual authentication data.

3. A portable audio listening apparatus according to claim 1, wherein the receiving apparatus further comprises means for storing individual authentication data.

4. A portable audio listening apparatus according to claim 1, wherein the portable receiving apparatus includes playback means for playing back an audio signal to be modulated and control means for controlling the playback means, wherein the playback means accommodates a detachable recording medium and reproduces an audio signal from the recording medium.

5. A portable audio listening apparatus according to claim 1, wherein the receiving apparatus further comprises recording means for recording an audio signal in a predetermined form, said receiving apparatus receives, by an electrode, an audio modulated signal transferred from a predetermined another transmission apparatus by using a human body, and demodulates the received audio modulated signal and records it in a predetermined recoding form by using the recording means.

6. A portable audio listening apparatus according to claim 5, wherein the frequency band of an audio modulated signal transmitted by the transmission apparatus is made different from that of an audio modulated signal transmitted by the predetermined another transmission apparatus.

7. A portable audio listening apparatus according to claim 1, wherein the third electrode, the second demodulating means and the second audible sound generating means are incorporated into a headphone.

8. A portable audio listening apparatus according to claim 1, wherein the third electrode is at least one ear pad on the headphone.

* * * * *